(12) United States Patent
Matsuda et al.

(10) Patent No.: US 8,996,605 B2
(45) Date of Patent: Mar. 31, 2015

(54) SERVICE PROVIDING SYSTEM, AND CLIENT, SERVER, AND COMPUTER PROGRAM USED FOR SUCH SYSTEM

(75) Inventors: Makoto Matsuda, North Brunswick, NJ (US); Kiyotaka Ohara, Aichi (JP); Kazuma Aoki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1526 days.

(21) Appl. No.: 11/473,343

(22) Filed: Jun. 23, 2006

(65) Prior Publication Data

US 2006/0294111 A1   Dec. 28, 2006

(30) Foreign Application Priority Data

Jun. 24, 2005   (JP) .................... 2005-185366

(51) Int. Cl.
| | |
|---|---|
| G06F 15/16 | (2006.01) |
| A61F 5/00 | (2006.01) |
| G06F 7/04 | (2006.01) |
| H04L 12/66 | (2006.01) |
| H04L 29/08 | (2006.01) |

(Continued)

(52) U.S. Cl.
CPC .............. *H04L 67/16* (2013.01); *H04L 12/66* (2013.01); *H04L 69/16* (2013.01); *G06F 21/10* (2013.01); *H04L 67/303* (2013.01)
USPC ............. 709/203; 600/40; 726/18; 370/352

(58) Field of Classification Search
CPC ........................... G06F 21/608; H04N 1/4433
USPC ............................. 705/14; 709/203
See application file for complete search history.

(56) References Cited

U.S. PATENT DOCUMENTS 5,440,719 A * 8/1995 Hanes et al. ............ 703/21
5,552,901 A * 9/1996 Kikuchi et al. ......... 358/468
5,832,510 A * 11/1998 Ito et al. .................. 711/100

(Continued)

FOREIGN PATENT DOCUMENTS

JP    H9238215    9/1997

*Primary Examiner* — Arvin Eskandarnia
*Assistant Examiner* — Margishi Desai
(74) *Attorney, Agent, or Firm* — Baker Botts L.L.P.

(57) ABSTRACT

In a service providing system, a client includes a transmitting unit configured to transmit specification information associated with specifications of the client to the management server, a receiving unit configured to receive registration completion information from a management server, a transmitting unit configured to transmit a request for service information to a service providing server, and a service prohibition unit configured to prevent receipt of the service information from the service providing server until the registration completion information is received after transmission of the specification information. The management server includes a receiving unit configured to receive the specification information, an information registration unit configured to register the received specification information while associating the specification information with the client, and a transmitting unit configured to transmit the registration completion information indicating completion of registration of the specification information to the client. The service providing server includes a receiving unit configured to receive the request for service information from the client, and an information generation unit configured to generate the service information based on the specification information, in response to receipt of the request for service information.

21 Claims, 7 Drawing Sheets

(51) Int. Cl.
*H04L 29/06* (2006.01)
*G06F 21/10* (2013.01)

(56) References Cited

U.S. PATENT DOCUMENTS

| | | | | |
|---|---|---|---|---|
| 5,905,866 A * | 5/1999 | Nakabayashi et al. | ......... | 709/223 |
| 5,909,602 A | 6/1999 | Nakai et al. | | |
| 5,946,457 A | 8/1999 | Nakai et al. | | |
| 5,948,063 A * | 9/1999 | Cooper et al. | ................ | 709/223 |
| 6,052,730 A * | 4/2000 | Felciano et al. | ............. | 709/225 |
| 6,170,014 B1 * | 1/2001 | Darago et al. | ................ | 709/229 |
| 6,180,862 B1 * | 1/2001 | Hirano | ............................ | 84/601 |
| 6,195,432 B1 * | 2/2001 | Takahashi et al. | ............ | 380/277 |
| 6,199,164 B1 * | 3/2001 | Nishimoto et al. | ................ | 726/2 |
| 6,212,548 B1 * | 4/2001 | DeSimone et al. | ........... | 709/204 |
| 6,249,817 B1 * | 6/2001 | Nakabayashi et al. | ........ | 709/224 |
| 6,282,573 B1 * | 8/2001 | Darago et al. | ................ | 709/229 |
| 6,321,266 B1 * | 11/2001 | Yokomizo et al. | ................ | 709/226 |
| 6,363,393 B1 * | 3/2002 | Ribitzky | ....................... | 707/102 |
| 6,473,786 B1 * | 10/2002 | Scouras et al. | ................ | 709/206 |
| 7,202,963 B2 * | 4/2007 | Wiebe et al. | ..................... | 358/1.15 |
| 7,512,965 B1 * | 3/2009 | Amdur et al. | ...................... | 726/1 |
| 7,689,618 B2 * | 3/2010 | Machida et al. | ............. | 707/740 |
| 7,716,708 B2 * | 5/2010 | Nishimura et al. | ............. | 725/97 |
| 2001/0005890 A1 * | 6/2001 | Nitaki | ........................... | 713/202 |
| 2001/0042086 A1 * | 11/2001 | Ueda et al. | .................... | 707/527 |
| 2002/0010658 A1 * | 1/2002 | Suzuki et al. | .................... | 705/28 |
| 2002/0091586 A1 * | 7/2002 | Wakai et al. | ..................... | 705/26 |
| 2002/0091770 A1 * | 7/2002 | Takakura et al. | ............. | 709/205 |
| 2002/0147645 A1 * | 10/2002 | Alao et al. | ........................ | 705/14 |
| 2003/0016263 A1 * | 1/2003 | Takahashi et al. | .............. | 347/19 |
| 2003/0016379 A1 * | 1/2003 | Takahashi et al. | ........... | 358/1.13 |
| 2003/0055883 A1 * | 3/2003 | Wiles, Jr. | ...................... | 709/203 |
| 2003/0133152 A1 * | 7/2003 | Matsueda | .................... | 358/1.15 |
| 2003/0223093 A1 * | 12/2003 | Baird et al. | ................. | 358/1.15 |
| 2004/0004733 A1 * | 1/2004 | Barker et al. | ................. | 358/1.13 |
| 2004/0021889 A1 * | 2/2004 | McAfee et al. | ................ | 358/1.13 |
| 2004/0030493 A1 * | 2/2004 | Pechatnikov et al. | ......... | 701/208 |
| 2004/0044649 A1 * | 3/2004 | Yamato et al. | .................... | 707/1 |
| 2004/0057065 A1 * | 3/2004 | Michimura et al. | ......... | 358/1.13 |
| 2004/0061893 A1 * | 4/2004 | Wada | .......................... | 358/1.15 |
| 2004/0172449 A1 * | 9/2004 | Hesselink et al. | ............. | 709/204 |
| 2005/0038530 A1 * | 2/2005 | Nagasaka et al. | ............ | 700/19 |
| 2005/0063541 A1 * | 3/2005 | Candelore | ..................... | 380/239 |
| 2005/0216300 A1 * | 9/2005 | Appelman et al. | ................ | 705/1 |
| 2005/0228891 A1 * | 10/2005 | Itoh et al. | ...................... | 709/228 |
| 2006/0089987 A1 * | 4/2006 | Igarashi et al. | ................ | 709/225 |
| 2006/0190624 A1 * | 8/2006 | Kegoya et al. | ................ | 709/246 |
| 2006/0265473 A1 * | 11/2006 | Muto | ............................ | 709/218 |
| 2007/0044146 A1 * | 2/2007 | Murase et al. | ................... | 726/10 |
| 2007/0233842 A1 * | 10/2007 | Roberts et al. | ............... | 709/223 |
| 2009/0237732 A1 * | 9/2009 | Kuroda et al. | ............... | 358/1.15 |
| 2009/0240765 A1 * | 9/2009 | Wiles, Jr. | ...................... | 709/203 |
| 2010/0134657 A1 * | 6/2010 | Tsujii et al. | ................ | 348/231.2 |

* cited by examiner

SERVICE PROVIDING SYSTEM, AND CLIENT, SERVER, AND COMPUTER PROGRAM USED FOR SUCH SYSTEM

CROSS-REFERENCE TO RELATED APPLICATION

This application claims priority under 35 U.S.C. §119 from Japanese Patent Application No. 2005-185366, filed on Jun. 24, 2005. The entire subject matter of the application is incorporated herein by reference.

FIELD

Aspects of the present invention relate to a service providing system in which a service is provided from a server to a client.

BACKGROUND

Recently, a service providing system in which a client is allowed to execute a function that the client does not have by requesting for execution of the function from a server connected to the client through a network has been proposed. An example of such a system is disclosed, for example, in Japanese Patent Provisional Publication No. HEI 9-238215 (hereafter, referred to as JP HEI 9-238215A). In the system disclosed in JP HEI 9-238215A, a digital copying device requests execution of an image processing function from a host computer.

In the service providing system, if the functions of the server are modified, for example, by adding a new function to the server, information on the modified part of the functions is notified from the server to the client, so that the client is able to allow a user to selectively register one of the functions into the client. That is, one of the functions requested by a user is registered into the client, and then the client becomes able to attain the selected function through the server.

However, the above mentioned service providing system has a drawback that the server is not able to provide a service to the client responsive to change of specifications of the client (e.g., addition of a print option to the client or change of a sheet cassette). That's because the server is not able to recognize the change of specifications of the client. If the change of the specifications of the client is not appropriately notified to the server, the client may fail to receive an appropriate service from the server.

Although in such a case the client is able to appropriately receive a service from the server by adjusting settings regarding the specifications of the client in accordance with information relating to the provided service each time the client receives the service. However, such an adjusting operation of the settings of the client is very troublesome for a user.

With regard to a service providing manner in which a service is provided for a client when a server becomes able to provide the service, the timing for providing a service for the client varies depending on a state of the server. Therefore, it is difficult for the user of the client to adjust settings of the client to an appropriate state each time the service is provided from the server to the client.

In addition, in order to receive a service from the server appropriately, the user needs to have a good knowledge of the entire specifications of the client and a good knowledge about how to adjust the settings regarding the specifications of the client to appropriately receive a service from the server. It is understood that users do not necessarily have the above mentioned knowledge. In addition, a user operation for adjusting the settings regarding the specifications of the client becomes a heavy burden on a user.

SUMMARY

Aspects of the present invention are advantageous in that a service providing system configured to enable a client to receive a service from a server appropriately without-requiring a user of the client to conduct a user operation for adjusting specifications of the client device in accordance with the service from the server is provided.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a service providing system having a client, a management server and a service providing server. In the system, the client includes a first client side transmitting unit configured to transmit specification information associated with specifications of the client to the management server, a first client side receiving unit configured to receive registration completion information from the management server, a second client side transmitting unit configured to transmit a request for service information to the service providing server, and a service prohibition unit configured to prevent receipt of the service information from the service providing server until the registration completion information is received by the first client side receiving unit after transmission of the specification information by the first client side transmitting unit. The management server includes a first management side receiving unit configured to receive the specification information from the client, an information registration unit configured to register the specification information received by the first management side receiving unit while associating the specification information with the client, and a first management side transmitting unit configured to transmit the registration completion information indicating completion of registration of the specification information by the information registration unit to the client. The service providing server comprises a first service side receiving unit configured to receive the request for service information from the client, and an information generation unit configured to generate the service information based on the specification information registered in the management sever while being associated with the client, wherein the information generation unit generates the service information in response to receipt of the request for service information from the client by the first service side receiving unit.

Since the specification information is transmitted to the management server, the management server is able to manage the specification information of the client. When the service providing server operates to provide a service for the client, the service providing server is able to generate service information cased on the specification information managed by the management server.

In other words, the service providing server is able to generate service information matching specifications of the client which has transmitted the request. Therefore, it becomes possible to appropriately provide a service for the client responsive to change of the specifications of the client, without requesting a user operation for changing the specifications on the client. The specification information may be transmitted the management server at a time when the client becomes an element of the service providing system or a time when the specification s of the client are changed.

If a service is provided for the client in a condition where the specification information managed in the management server is not the latest, a client may become unable to receive a service appropriately because old specification information is used to generate service information. By contrast, according to the service providing system, the service prohibition unit configured to prohibit receipt of the service information from the service providing server until the registration completion information is received by the first client side receiving unit after transmission of the specification information by the first client side transmitting unit Therefore, it is possible to prevent an inappropriate service from being provided for the client until the specification registered in the management server is updated.

If the client has a detection unit configured to detect the fact that the client moves to a state of being an element of the service providing system, the client may transmit the specification information to the management server at a time when the client moves to the state of being an element of the service providing system. Alternatively or additionally, if the client has a detection unit configured to detect change of specifications of the client, the clinet may transmit the specification information to the management server at a time when the chance of the specifications is detected by the detection unit.

The client may transmit the request for service information at a time when a direct access to an access target (e.g., a particular URL or a port in the service providing server) is conducted or a time when a particular process is executed on the client.

The service information may be generated through a process in which the ma request for specification is transmitted from the service information server to the management server, and thereafter the specification is transmitted from the management server to the service providing server.

In at least one aspect, the client may include a second client side receiving unit configured to receive the service information transmitted from the service providing server, and a function execution unit configured to execute a function based on the service information received by the second client side receiving unit. In this configuration, the service proving server comprises a first service side transmitting unit configured to transmit the service information generated by the information generation unit to the client With this configuration, the client prohibits the transmission of the request for service information until the registration of the specification information is completed on the management server. Therefore, it becomes possible to prevent an inappropriate service from being provided for the client, while preventing service information from being generated on the service providing server (or being transmitted to the client) directly responding to the request from the client In at least one aspect, the service prohibition unit of the client controls the second client side transmitting unit to stop to transmit the request for service information, such that receipt of the service information from the service providing server is prevented.

In at least one aspect, the client includes a third client side transmitting unit configured to transmit to the management server an inquiry associated with whether service information to be provided for the client exists, and a third client side receiving unit configured to receive a response associated with the inquiry from the management server. In this configuration, the second client side transmitting unit transmits the request for service information to the information providing server in response to receipt of the response indicating the presence of service information to be provided for the client. The service prohibition unit prevents at least one of transmission of the request for service information by the second client side transmitting unit and transmission of the inquiry by the third client side transmitting unit, such that receipt of the service information from the service providing server is prevented. The management server includes a second management side receiving unit configured to receive provision information associated with service information to be provided for a particular client from the service providing server, an information management unit configured to register information associated with service information to be provided for the particular client based on the provision information received by the second management side receiving unit, a third management side receiving unit configured to receive the inquiry from the client, a service extraction unit configured to extract information representing service information to be provided for the client from information registered by the information management unit, in response to the inquiry from the client, and a second management side transmitting unit configured to transmit the information extracted by the service extraction unit to the client as the response to the inquiry. The service providing server further comprises a second service side transmitting unit configured to transmit the provision information associated with service information to be provided for the particular client to the management server.

If the service prohibition unit prohibits transmission of the request for service information by the second client side transmitting unit, it is possible to prevent the service providing server from generating (or transmitting) the service information directly responding to the request. If the service prohibition unit prohibits transmission of the inquiry by the third client side transmitting unit, it is possible to prevent the service providing server from transmitting the extracted information directly responding to the inquiry. Therefore, it is possible to prevent the service providing server from providing an inappropriate service for the client.

It should be noted that the prohibition of the request for service information may be attained in various ways, and the prohibition of transmission of the inquiry may be attained in various ways.

In at least one aspect, the client includes a fourth client side transmitting unit configured to transmit an advance notice indicating that the client is ready for transmission of the specification information, and a fourth client side receiving unit configured to receive an acknowledgment of transmission transmitted from the management server which received the advance notice. In this configuration, the first client side transmitting unit transmits the specification information to the management server in response to receipt of the acknowledgment of transmission from the management sever. The management server includes a fourth management side receiving unit configured to receive the advance notice from the client, and a third management side transmitting unit configured to transmit the acknowledgment of transmission to the client after the advance notice is received by the fourth management side receiving unit, wherein the acknowledgement of transmission indicates that the management server accepts the specification information.

With this configuration, the specification information is not transmitted at a time when the client moves to a state of being an element of the system or a time when the specifications of the client are changed (i.e., the specification information is not transmitted immediately after the client moves to a state of being able to transmit the specification information), but the advance notice is transmitted in advance. After receiving the advance notice, the management server is able to accept the specification information from the client at a time when the management server is able to send the acknowledgment of transmission (i.e., at a time when the management server is ready for registration of the specification information).

The management server may transmit the acknowledgment of transmission when the processing load on the management server is lower than a certain level, or when the management server does not executes a certain process. Such a configuration is suitable because the management server is able to receive the specification information at convenient times for the management server.

According to another aspect of the invention, there is provided a client device configured to communicate with a management server and a service providing server. The client device includes a first client side transmitting unit configured to transmit specification information associated with specifications of the client device to the management server, a first client side receiving unit configured to receive registration completion information from the management server; a second client side transmitting unit configured to transmit a request for service information to the service providing server, and a service prohibition unit configured to prevent receipt of the service information from the service providing server until the registration completion information is received by the first client side receiving unit after transmission of the specification information by the first client side transmitting unit.

With this configuration, it is possible to appropriately provide a service for the client responsive to change of the specifications of the client, without requesting a user operation for changing the specifications on the client.

In at least one aspect, the client device further comprises a second client side receiving unit configured to receive the service information transmitted from the service providing server; and a function execution unit configured to execute a function based on the service information received by the second client side receiving unit.

In at least one aspect, the service prohibition unit of the client controls the second client side transmitting unit to stop to transmit the request for service information, such that receipt of the service information from the service providing server is prevented.

In at least one aspect, the client device further comprises a third client side transmitting unit configured to transmit to the management server an inquiry associated with whether service information to be provided for the client exists, and a third client side receiving unit configured to receive a response associated with the inquiry from the management server. In this case, the second client side transmitting unit transmits the request for service information to the information providing server in response to receipt of the response indicating the presence of service information to be provided for the client. The service prohibition unit prevents at least one of transmission of the request for service information by the second client side transmitting unit and transmission of the inquiry by the third client side transmitting unit, such that receipt of the service information from the service providing server is prevented.

In at least one aspect, the client device further comprises a fourth client side transmitting unit configured to transmit an advance notice indicating that the client is ready for transmission of the specification information, and a fourth client side receiving unit configured to receive an acknowledgment of transmission transmitted from the management server which received the advance notice. In this case, the first client side transmitting unit transmits the specification information to the management server in response to receipt of the acknowledgment of transmission from the management sever.

According to another aspect of the invention, there is provided a server configured to communicate with a client and a service providing server. The server includes a first management side receiving unit configured to receive specification information associated with specifications of the client from the client, an information registration unit configured to register the specification information received by the first management side receiving unit while associating the specification information with the client, and a first management side transmitting unit configured to transmit registration completion information to the client, wherein the registration completion information indicates completion of registration of the specification information by the information registration unit.

Such a configuration makes it possible to appropriately provide a service for the client responsive to change of the specifications of the client, without requesting a user operation for changing the specifications on the client.

In at least one aspect, the server further comprises a second management side receiving unit configured to receive provision information associated with service information to be provided for a particular client, an information management unit configured to register information associated with service information to be provided for the particular client based on the provision information received by the second management side receiving unit, a third management side receiving unit configured to receive the inquiry from the client; a service extraction unit configured to extract information representing service information to be provided for the client from information registered by the information management unit in response to the inquiry from the client, and a second management side transmitting unit configured to transmit the information extracted by the service extraction unit to the client as the response to the inquiry.

In at least one aspect, the server further comprises a fourth management side receiving unit configured to receive the advance notice from the client, and a third management side transmitting unit configured to transmit the acknowledgment of transmission to the client after the advance notice is received by the fourth management side receiving unit, wherein the acknowledgement of transmission indicates that the management server accepts the specification information.

According to another aspect of the invention, there is provided a server configured to communicate with a client and a management server. The server includes a first service side receiving unit configured to receive a request for service information from the client, an information generation unit configured to generate service information based on specification information registered in the management sever while being associated with the client, wherein the information generation unit generates the service information in response to receipt of the request for service information from the client by the first service side receiving unit, and a first service side transmitting unit configured to transmit the service information generated by the information generation unit to the client.

Such a configuration makes it possible to appropriately provide a service for the client responsive to change of the specifications of the client, without requesting a user operation for changing the specifications on the client.

In at least one aspect, the server further comprises a second service side transmitting unit configured to transmit provision information associated with service information to be provided for a particular client to the management server.

According to another aspect of the invention, there is provided a computer usable medium having computer readable instructions stored thereon, which, when executed by a computer, are configured to transmit specification information associated with specifications of a client device to the management server, to receive registration completion information from the management server, to transmit a request for service information to the service providing server, to receive service information transmitted from the service providing server, to execute a function based on the received service information received, and to prevent receipt of the service information from the service providing server until the registration completion information is received after transmission of the specification information to the management server.

Such a configuration makes it possible to appropriately provide a service for the client responsive to change of the specifications of the client, without requesting a user operation for changing the specifications on the client.

According to another aspect of the invention, there is provided a computer usable medium having computer readable instructions stored thereon, which, when executed by a computer, are configured to receive specification information associated with specifications of a client from the client, to register the specification information while associating the specification information with the client, and to transmit registration completion information to the client, wherein the registration completion information indicates completion of registration of the specification information.

Such a configuration makes it possible to appropriately provide a service for the client responsive to change of the specifications of the client, without requesting a user operation for changing the specifications on the client.

In at least one aspect, when the computer readable instructions are executed by the computers the computer readable instructions are further configured to receive provision information associated with service information to be provided for a particular client, to register information associated with service information to be provided for the particular client based on the provision information received by the second management side receiving unit, to receive an inquiry from the client, to extract information representing service information to be provided for the client from information registered by the information management unit in response to the inquiry from the client, and to transmit the information extracted by the service extraction unit to the client as the response to the inquiry.

In at least one aspect, when the computer readable instructions are executed by the computer, the computer readable instructions are further configured to receive the advance notice from the client, and to transmit the acknowledgement of transmission to the client after the advance notice is received by the fourth management side receiving unit, wherein the acknowledgement of the transmission indicates that the management server accepts the specification information.

According to another aspect of the invention, there is provided a computer usable medium having computer readable instructions stored thereon, which, when executed by a computer, are configured to receive a request for service information from a client, generate service information based on specification information registered in a management sever while being associated with the client, wherein the service information is generated in response to receipt of the request for service information from the client, and to transmit the service information to the client.

Such a configuration makes it possible to appropriately provide a service for the client responsive to change of the specifications of the client, without requesting a user operation for changing the specifications on the client.

In at least one aspect, when the computer readable instructions are executed by the computer, the computer readable instructions are further configured to transmit provision information associated with service information to be provided for a particular client to the management server.

Illustrative Embodiments

Hereafter, an illustrative embodiment according to the invention will be described with reference to the accompanying drawings.

Figure 1:
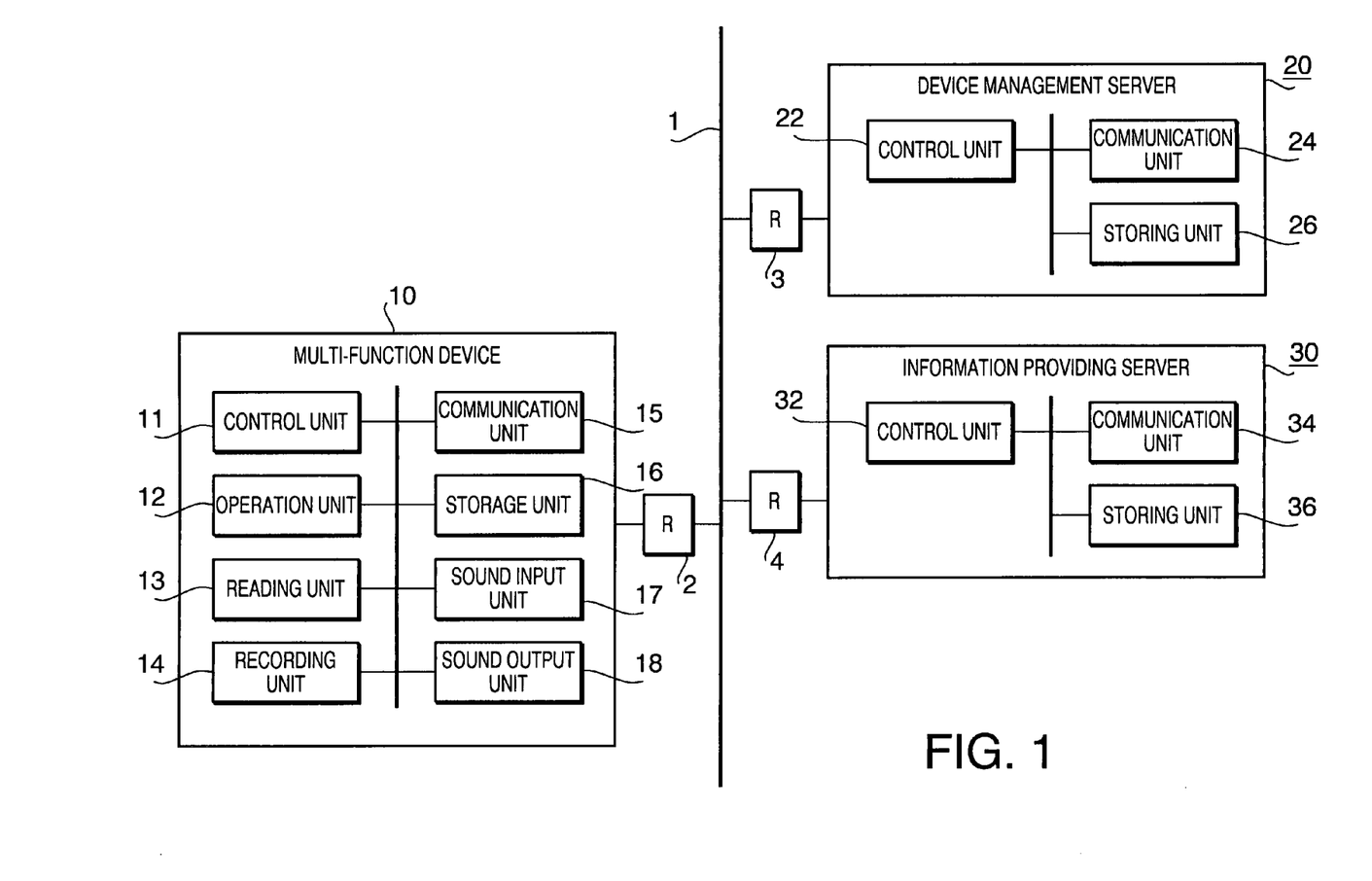
FIG. 1 is a block diagram of a service providing system 100 according to an embodiment of the invention.

FIG. 1 is a block diagram of a service providing system 100 according to an embodiment of the invention. The service providing system 100 includes a MFD (multi-function device) 10, a device management server (hereafter, referred to as a "management server") 20, and an information providing server 30, which are capable of communicating with each other via a network 1. The MFD 10, the management server 20 and the information providing server 30 are connected to the network 1 via routers 2, 3 and 4, respectively. Each of the routers 2, 3 and 4 is, for example, a broadband router.

The MFD 10 includes a control unit 11, an operation unit 12, a reading unit 13, a recording unit 14, a communication unit 15, a storage unit 16, a sound input unit 17 and a sound output unit 18. The control unit 11 includes a CPU, a ROM and a RAM, and the CPU controls the entire functions of the MFD 10 in accordance with programs stored in the ROM.

The operation unit 12 is configured as a user interface having operation keys (e.g., a copy key, a scanner key, a FAX key, a service key, a setting key and direction (up, down right and left) keys, an OK key, and a cancel key) and a display. The reading unit 13 is an input device having a function as a scanner and is able to read an image recorded on a recording medium and generate image data corresponding to the image.

The recording unit 14 is an output device having a function as a printer and is able to print an image corresponding to image data on a sheet. The communication unit 15 interfaces the MFD 10 with the network 1 by processing data to transmit and receive data through the network 1.

The storage unit 16 is, for example, an NV RAM (non-volatile RAM) which stores various types of information. The sound input unit 17 includes a microphone provided in a handset (not shown) of the MFD 10, and is able to generate sound data (e.g., PCM data) representing sound inputted through the microphone. The sound output unit 18 outputs sound corresponding to the sound data (e.g., PCM data) through a speaker which is provided in the handset or in a main body of the MFD 10.

The management server 20 includes a control unit 22, a communication unit 24, and a storage unit 26. The control unit 22 includes a CPU, a ROM and a RAM, and the CPU controls the entire functions of the management server 20 in accordance with programs stored in the ROM. The communication unit 24 interfaces the management server 20 with the network 1, and processes data to transmit/receive data through the network 1. The storage unit 26 is, for example, a hard disk drive in which various types of data is stored.

The information providing server 30 includes a control unit 32, a communication unit 34, and a storage unit 36. The control unit 32 includes a CPU, a ROM and a RAM, and the CPU controls the entire functions of the information providing server 30 in accordance with programs stored in the ROM. In this embodiment, the control unit 32 has considerably higher performance than the control unit 11 of the MFD 10. The communication unit 34 interfaces the information providing server 30 with the network 1, and processes data to transmit/receive data through the network 1. The storage unit 36 is, for example, a hard disk drive in which various types of data is stored.

Figure 2:
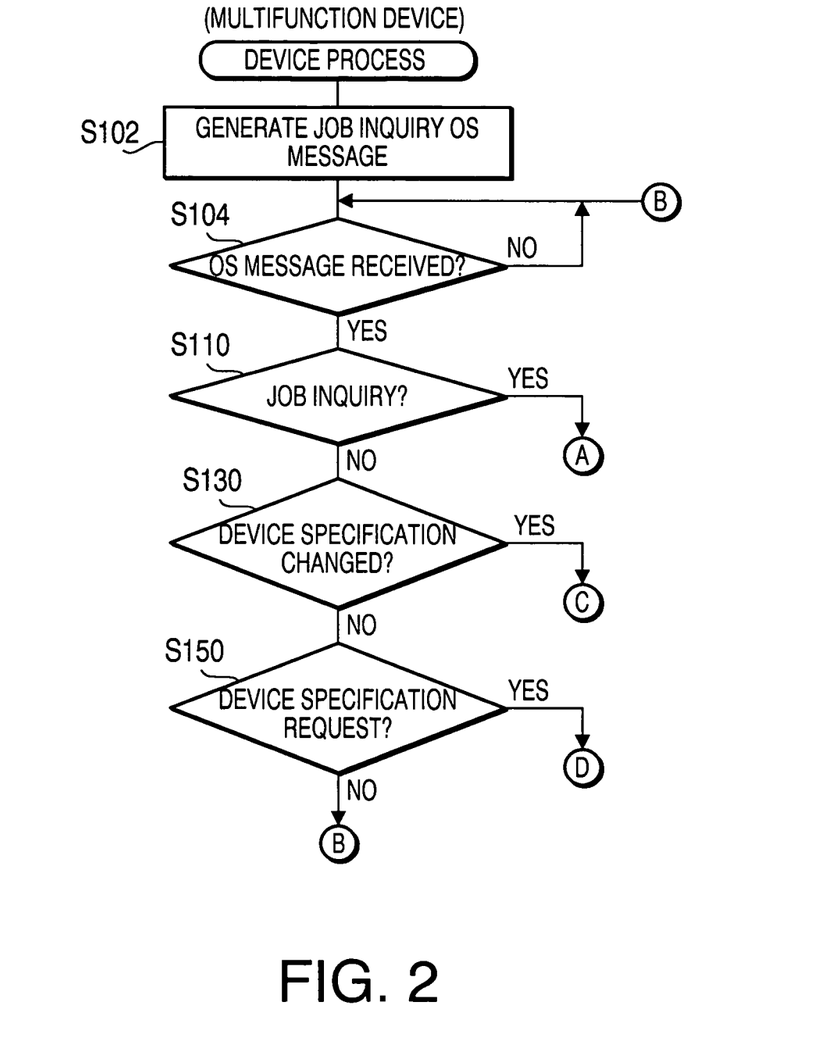
FIGS. 2 and 3 illustrate a device process executed by a multi-function device.
Figure 3:
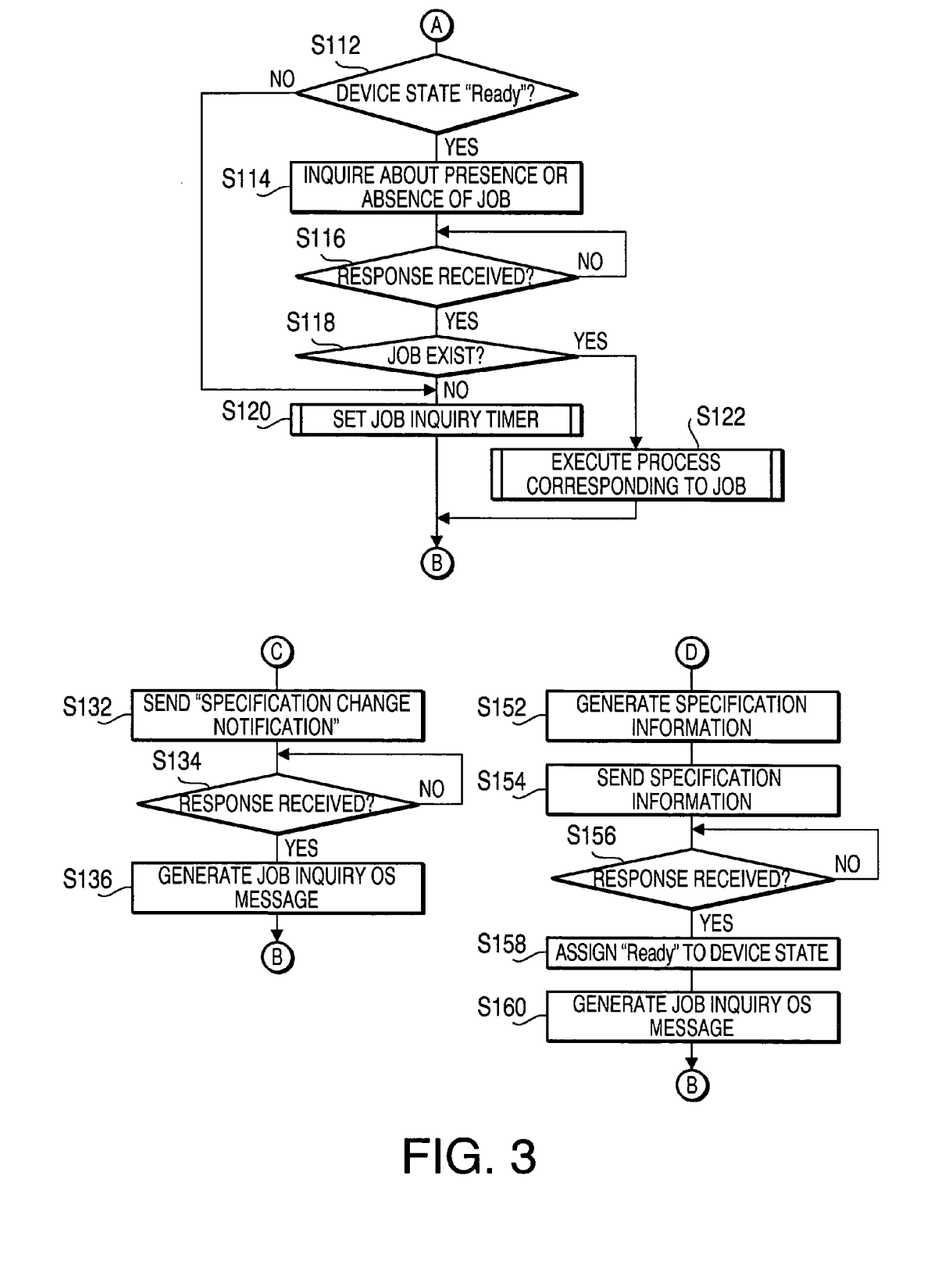

Operations of the MFD 10 will now be described. FIGS. 2 and 3 illustrate a device process executed under control of the control unit 11 of the MFD 10. The device process is executed repeatedly after the MFD 10 is turned to ON. First, the control unit 11 creates a job inquiry OS message (step S102). The job inquiry OS message is an OS message to be passed to an internal process for the device process.

Next, in step S104, the control unit 11 judges whether the OS message is received. The control unit 11 waits until the OS message is received. If the OS message is received (S104: YES), the control unit 11 judges whether the received OS massage is a job inquiry OS message (step S110). If the received OS massage is a job inquiry OS message (S110: YES), control proceeds to step S112 where the control unit 11 judges whether a device state is set for "Ready". The device state is a variable which is set for "SpecChg" when specifications of the MFD 10 are changed, and is set for "Ready" when a response from a device management server to which notification about change of the specifications has been sent is received.

If the device state is "Ready" (S112: YES), the control unit 11 sends an inquiry about presence or absence of a job to be executed, to the management server 20 (step S114). The inquiry contains a device ID assigned to the MFD 10 so that a source of the inquiry can be identified. As described below, the management server 20 includes a job database in which information on jobs to be executed by client devices and addresses (URLs) to be accessed to process the respective jobs is stored, while the information of each job and its corresponding address are associated with each device ID.

After receiving the inquiry in step S114, the management server 20 extracts a record corresponding to the device ID of the MFD 10 relating to the inquiry, from the job database, and sends registration information representing the extracted record back to the MFD 10 as a response to the inquiry. If the management server 20 does not find the record in the job database, information indicating that no record is extracted is sent back to the MFD 10. In the following, it is assumed that a request (e.g., an inquiry) sent out by the MFD 10 contains a device ID.

After the inquiry is made, the control unit 11 waits until a response from the management server 20 is received (step S116: NO). If the response is received (S116: YES), the control unit 11 judges whether a job to be executed exists based on the registration information received as the response (step S118).

Figure 4:
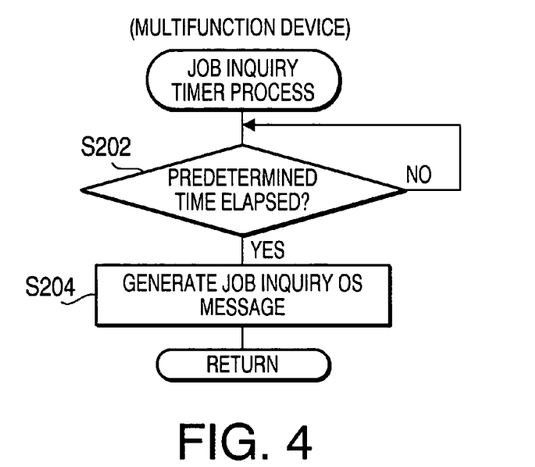
FIG. 4 shows a job inquiry timer process to be executed in the device process under control of the multi-function device.

If a job to be executed does not exist (S118: NO), the control unit 11 sets a job inquiry timer (step S120). Then, control returns to step S104. FIG. 4 shows a job inquiry timer process to be executed in step S120. In the job inquiry timer process, the control unit 11 waits a predetermined time (step S202). After the predetermined time has elapsed (S202: YES), the control unit 11 creates a job inquiry OS message (step S204).

Figure 5:
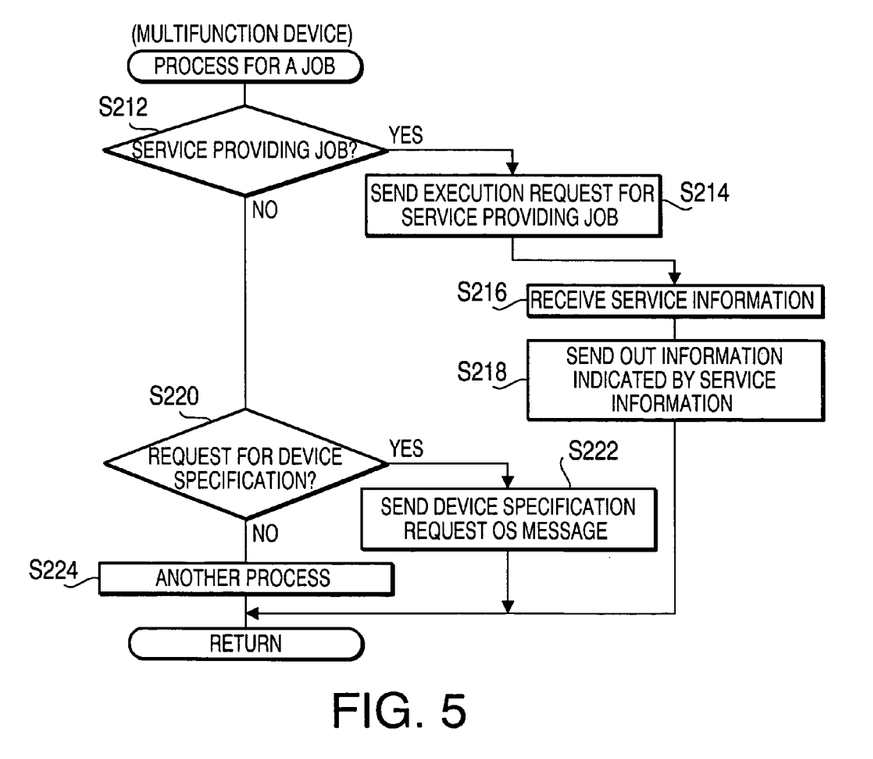
FIG. 5 shows a process for a job to be executed in the device process under control of the multi-function device.

If it is judged in step S118 that a job to be executed exists (S118: YES), a process for the job is executed in step S122. After the process of the job is executed, control returns to step S104. FIG. 5 shows a process for a job to be executed in step S122. In the process for a job, the control unit 11 judges the job represented by the registration information transmitted from the management sever 20 as the response corresponds to a job concerning a service to be received from the information providing server 30 (step S212).

If the job represented by the registration information corresponds to a job concerning a service to be received from the information providing server 30 (S212: YES), the control unit 11 transmits a request for execution of a service providing job to an address (i.e., an address of the information providing server 20) contained in the registration information (step S214). If service information transmitted from an access target (i.e., the information providing server 20) is received (step S216), an output operation for the service information is executed by the recording unit 14 (step S218).

If the judgment result of step S212 is "NO", control proceeds to step S220 where the control unit 11 judges whether a service represented by the registration information corresponds to a device specification request job. If a service represented by the registration information corresponds to a device specification request job (S220: YES), the control unit 11 transmits a device specification request OS message (step S222). If a service represented by the registration information does not correspond to a device specification request job (S220: NO), a process for the job is executed (step S224).

If the received OS massage is not a job inquiry OS message (S110: NO), the control unit 11 judges whether the received OS message is a device specification change OS message (step S130). As described below, the device specification change OS message is created when the specifications of the MFD 10 are changed.

If the received OS message is a device specification change OS message (S130: YES), the control unit 111 transmits a "specification change notification" indicating that the specifications of the MFD 10 have been changed to the management server 20, as a request (step S132). After receiving the specification change notification, the management server 20 registers a device specification request job, and thereafter sends a response which represents an acknowledgement of receipt of the notification and completion of registration of the job, back to the MFD 10.

After the specification change notification is thus sent to the management server 20, the control unit 11 waits until the response is received (S134: NO). If the response is received (S134: YES), a job inquiry OS message is created (step S136). Then, control returns to step S104.

If it is judged in step S130 that the received OS message is not a device specification change OS message (S130: NO), the control unit 11 judges whether the received OS message is "a device specification request OS message" (step S150). The device specification request OS message is an OS message created in step S222 of FIG. 5.

If it is judged in step S150 that the received OS message is a device specification request OS message (S150: YES), specification information containing the specification of the MFD 10 is created (step S152), and then the specification information is sent to the management server 20 as a request (step S154). The specifications contained in the specification information include permanent parameters concerning the functions of the MFD 10 (e.g., reading, recording, and sound input/output functions), and variable parameters such as a version of firmware installed in the MFD 10 and information concerning presence or absence of an extended function unit which is detachably attached to the MFD 10.

After receiving the specification information, the management server 20 registers the specifications represented by the received specification information, and then sends registration completion information indicating completion of the registration, back to the MFD 10, as a response.

After sending the specification information, the control unit 11 waits until a response from the management server 20 is received (S156: NO). If the response is received (S156: YES), "Ready" is assigned to the device state (step S158). Next, the control unit 11 creates a job inquiry OS message (step S160). Then, control returns to step S104. If it is judged in step S150 that the received OS message is not a device specification request OS message (S150: NO), control returns to step S104.

Hereafter, a specification monitoring process to be executed by the MFD 10 is described with reference to FIG. 6. The specification monitoring process is executed repeatedly under control of the control unit 11 after the MFD 10 is turned to ON.

When the specification monitoring process is initiated, first, the control unit 11 waits until the specifications of the MFD 10 are changed (step S232: NO). More specifically, if change of the version of the firmware (i.e., update of the firmware) is detected or the attachment of an extended function unit to the MFD 10 is detected by an attachment sensor (not shown), the control unit 11 judges that the specifications are changed. If the specifications are changed (S232; YES), the device state is set for "SpecChg" (step S234).

After the device state is set for "SpecChg", the control unit 11 creates a device specification change OS message (step S236). Then, control returns to step S232. The device specification change OS message is checked in step S104 or S130 in FIG. 2.

Figure 7:
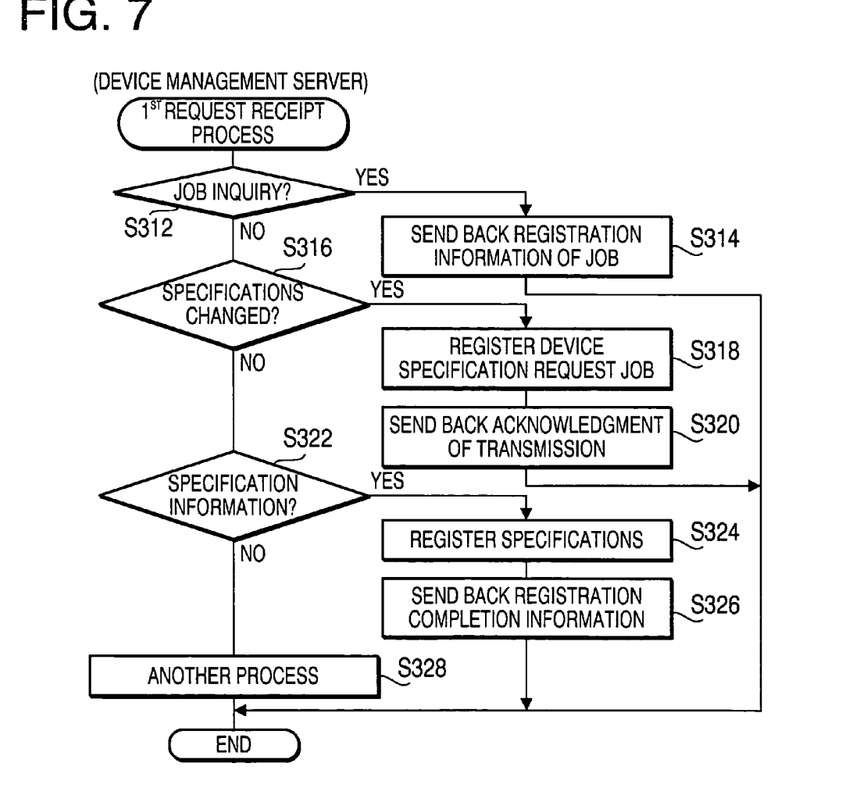
FIG. 7 is a flowchart illustrating a $1^{st}$ request receipt process executed by a management server.

Hereafter, operations of the management device 20 are described. FIG. 7 is a flowchart illustrating a $1^{st}$ request receipt process to be executed under control of the control unit 22 of the management server 20. The $1^{st}$ request receipt process is executed each time the management server 20 receives a request from the MFD 10.

When the $1^{st}$ request receipt process is initiated, first, the control unit 22 judges whether a request which has been received corresponds to a job inquiry (step S312). The job inquiry is sent out by the MFD 10 in step S114 of FIG. 3. If it is judged in step S312 that the received request corresponds to a job inquiry (S312: YES), the control unit 22 sends the registration of a job back to the MFD 10, which transmitted the request, as a response (step S314). Then, the $1^{st}$ request receipt process terminates.

In step S314, the control unit 22 extracts a job corresponding to the device ID designated by the request, from the job database stored in the storage unit 26, and the registration information designating the extracted job is sent out. If no job is extracted from the job database, information indicating the fact that no job is extracted is sent out. The registration information is received by the MFD 10 in step S116 of FIG. 3.

If it is judged in step S312 that the request does not correspond to a job inquiry (S312: NO), the control unit 22 judges whether the request is a specification change notification (step S316). The specification chance notification is a request which is transmitted from the MFD 10 in step S132 of FIG. 3.

If the request is a specification change notification (S316: YES), the control unit 22 registers the device specification request job and the device ID identified by the request in the job database, while associating the device specification request job with the device ID, so that a service to be provided for the MFD 10 which transmitted the request is registered (step S318). Next, an acknowledgement of receipt of the request is sent back to the MFD 10 so as to notify the MFD 10 of the completion of the registration of the service (step S320). Then, the $1^{st}$ request receipt process terminates.

If the request is not a specification change notification (S316: NO), the control unit 22 checks whether the request is the specification information (step S322). The specification information is a request which is transmitted from the MFD 10 in step S154 of FIG. 3.

If the request is the specification information (S322: YES), the control unit 22 registers the specifications and the device ID identified by the request in a device specification database (in which device IDs are associated with specifications of client devices, respectively) while associating the specifications with the device ID, so that the specifications of the MFD 10 which transmitted the request are registered (step S324). Next, the control unit 22 sends registration completion information indicating completion of the registration back to the MFD 10 (step. S326). Then, the $1^{st}$ request receipt process terminates.

Figure 8:
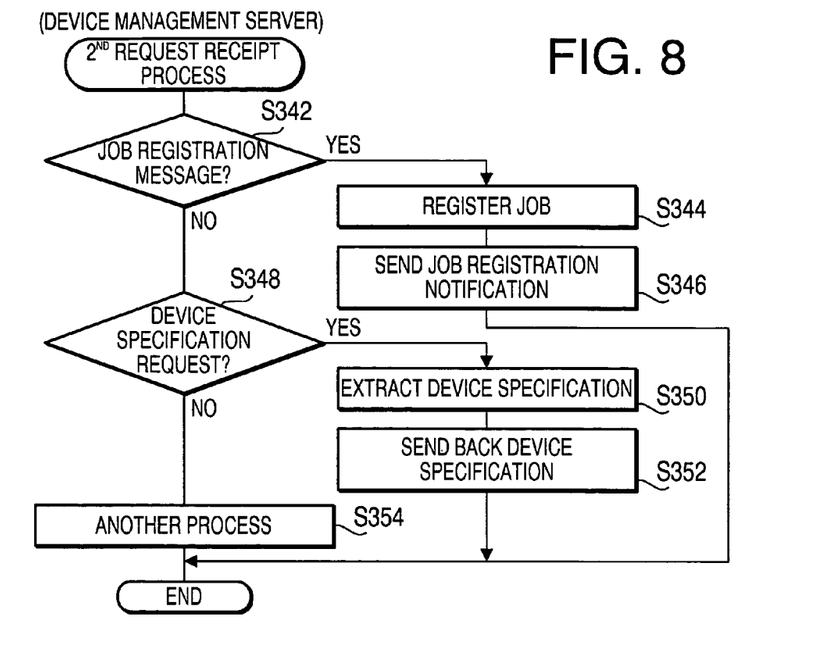
FIG. 8 is a flowchart illustrating a $2^{nd}$ request receipt process executed by the management server.

FIG. 8 is a flowchart illustrating a $2^{nd}$ request receipt process executed by the management server 20. The $2^{nd}$ request receipt process is executed repeatedly under control of the control unit 2 of the management server 20 each time the control unit 22 receives a request from the information providing server 30.

When the $2^{nd}$ request receipt process is initiated, first, the control unit 22 checks whether a request which has been received corresponds to a job registration message (step S342). As described below, the information providing server 30 transmits the job registration message to the management server 20 so as to register a job to be executed by a particular client in the job database. The job registration message is a request having information to specify the device ID of a device, contents of the job, and an address (URL) to be accessed to execute the job.

If the request is a job registration message (S342: YES), the control unit 22 registers the device ID and the job specified by the request in the job database, while associating the device ID with the job (step S344). Next, the control unit 22 sends a job registration notification indicating completion of the registration, to the information providing server 20 which transmitted the request, as a response (step S346). Then, the $2^{nd}$ request receipt process terminates.

If the request is not a job registration message (S342: NO), the control unit 22 judges whether the request is a device specification request (step S348). As described below, the information providing server 30 transmits the device specification request to request for specification information representing the specifications of a device. The specification request contains information for specifying the device ID of the device.

If the request is a device specification request (S348: YES), the control unit 22 extracts specification information corresponding to the device ID specified by the request, from the device specification database (step S350). Next, the control unit 22 sends the extracted specification information back to the information providing server 30 which transmitted the request, as a response (step S352). Then, the $2^{nd}$ request receipt process terminates.

If the request is not a device specification request (S348: NO), another process based on the request is executed (step S354). Then, $2^{nd}$ request receipt process terminates.

Figure 9:
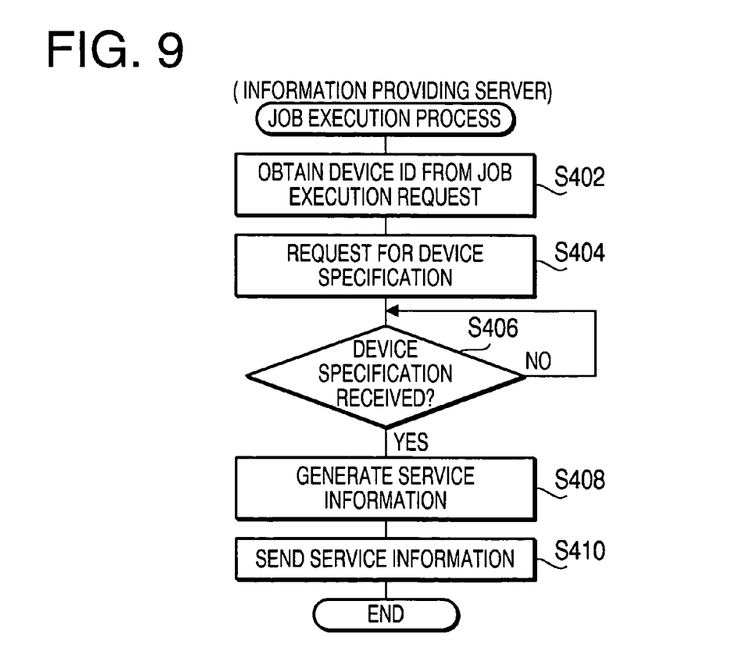
FIG. 9 is a flowchart illustrating a job execution process to be executed by an information providing server.

Hereafter, operations of the information providing server 30 are described. FIG. 9 is a flowchart illustrating a job execution process to be executed under control of the control unit 31 of the information providing server 30. The job execution process is executed each time the information providing server 30 receives a request for execution of a service providing job transmitted from the MFD 10 in step S214.

When the job execution process is initiated, first, a device ID is obtained from the request for execution which has been received before the initiation of the job execution process (step S402). Next, the control unit 32 sends a device specification request for specification information of the MFD 10 corresponding to the device ID obtained in step S420, to the management server 20 (step S404). The device specification request is received by the management server 20, and reception of the device specification request in the management server 20 causes the management server 20 to initiate the $2^{nd}$ request receipt process shown in FIG. 8. After receiving the device specification request, the management server 20 sends specification information responding to the device specification request back to the information providing server 30, as a response (see step S352).

After transmitting the device specification request, the control unit 32 waits until a response from the information providing server 30 is received (S406: NO). If a response is received (S406: YES), the control unit 32 generates service information to be provided for the MFD 10 which transmitted the request for execution in step S402, in accordance with the specification information contained in the response (step S408). More specifically, information (e.g., contents) matching the specifications indicated by the response are generated as the service information.

The service information generated in step S408 is transmitted to the MFD 10 which transmitted the request for execution in step S402 (step S410). Then, the job execution process terminates. The service information is received by the MFD 10 in step S216 of FIG. 5.

Figure 10:
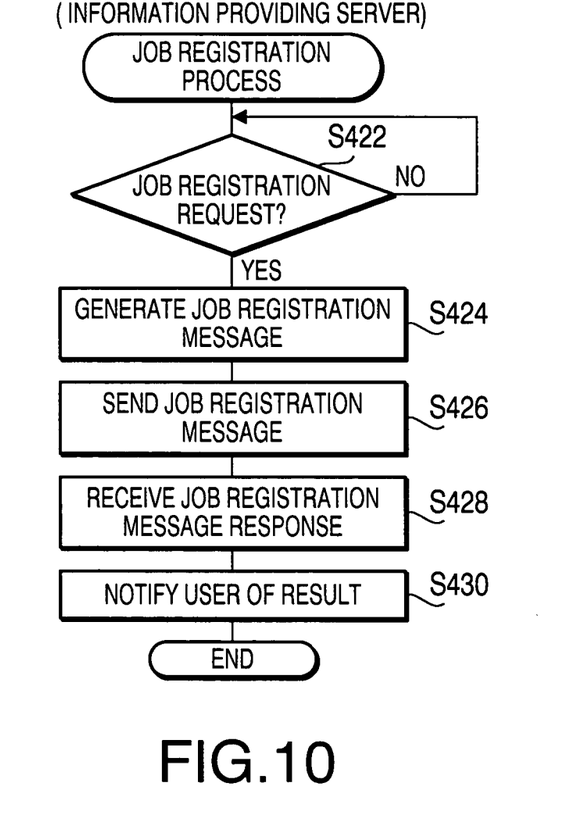
FIG. 10 is a flowchart illustrating a job registration process to be executed by an information providing server.

FIG. 10 is a flowchart illustrating a job registration process to be executed under control of the control unit 32 of the information providing server 30. The job registration process is initiated when a user operation to the information providing server 30 is conducted or a command from an external device is received in the information providing server 30. The command may be transmitted from an external device which is connected to the information providing server via a network.

When the job registration process is initiated, first, the control unit 32 waits until a job registration request is received (S422: NO). It should be noted that a job registration request may be received as a user operation which has been conducted before the initiation of the job registration process or a command which has been transmitted from an external device before the initiation of the job registration process.

If a job registration request is received (S422: YES), the control unit 32 creates a job registration message based on the received job registration request (step S424). The job registration request is inputted as an instruction accompanied by contents of a job, a device ID of a device which is to execute the job, and an address (URL) to be accessed to execute the job. In step s424, a message representing the job, the device ID, and the address accompanying the job registration request is created as a job registration message.

Next, the control unit 32 transmits the job registration message created in step S424 to the management server 20 (step S426). The job registration message is created in a form of a request which is to be received by the management server 20 in step S342 of FIG. 8. After receiving the job registration message (the request), the management server 20 conducts a registration in accordance with the job registration message, and then transmits a job registration notification back to the information providing server 30, as a response.

After transmitting the job registration message, the control unit 32 receives a job registration notification (i.e., the response) (step S428). Then, the control unit 32 writes information indicating that the job is successfully registered in the management server 20 in a log (i.e., the information is stored in the storage unit 36), or a notification indicating that the job is successfully registered in the management server 20 is transmitted to a source (the external device) of the command (step S430). Then, the job registration process terminates.

According to the service providing system 100, the specification information representing the specifications of the MFD 10 is transmitted to the MD 10 (S154 of FIG. 3), which enables the management server 20 to manage the specification information of the MFD 10 (see S324 of FIG. 7). When the information providing server 30 which received the request from the MFD 10 provides a service for the MFD 10, service information concerning a service is generated in accordance with the specification information managed in the management server 20 (S408 of FIG. 9).

That is, the information providing server 30 is able to generate service information matching specifications of a client, to the client which requested the service. Since transmission of the specification information from the MFD 10 to the management server 20 is performed, for example, concurrently with the change of the specifications of the MFD 10, the information providing server 30 is able to appropriately provide services in response to the change of the specifications of the MFD 10.

In the service providing system 100, the information providing server 30 is configured to refer to the specification information managed in the management server 20. Such a configuration may raise a problem that a client device becomes unable to receive a service appropriately because old specification information is used to generate service information if a service is provided for the client in a condition where the specification information managed in the management server 20 is not the latest.

By contrast, according to the embodiment, the device process is configured such that control does not proceeds to step S114 until "Ready" is assigned to the device state (step S234 of FIG. 6) from a time when "SpecChg" is assigned to the device state (step S158 of FIG. 3). In other words, a service from the information providing server 30 is prevented from being provided for a client until the response indicating that the registration for the specification information is completed is issued by the management server 20. Therefore, it is impossible to prevent an inappropriate service from being provided for a client. That is, if the specification information managed in the management server 20 is not the latest, a service is not provided until the specification information managed in the management server 20 is updated.

According to the embodiment, services are provided for a client by providing service information generated in the information providing server 30 for the client (see S410 of FIG. 9).

Figure 6:
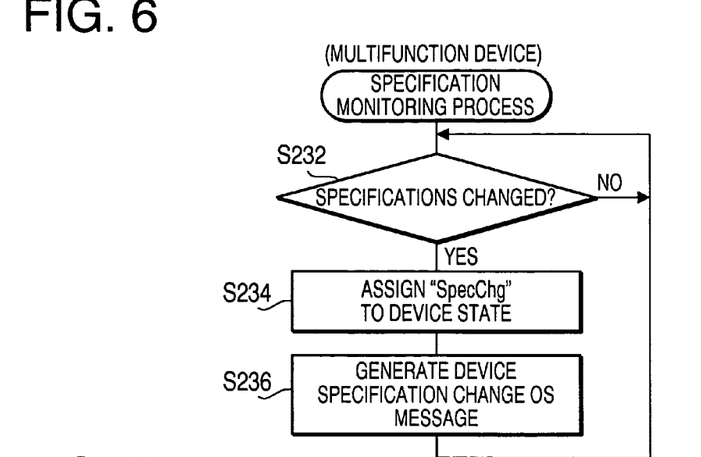
FIG. 6 is a flowchart illustrating a specification monitoring process to be executed by the multi-function device.

In the above mentioned embodiment, the MFD 10 does not transmit the specification information immediately after the MFD 10 has become ready for transmission of changed specification information (see S232 of FIG. 6). In this case, the MFD 10 transmits a specification change notification indicating that the specifications have been changed before transmitting the specification information, as an advance notice (sec S132 of FIG. 3). By receiving the advance notice, the management server 20 is able to receive the specification information from the MFD 10 which provided the advance-notice, after the management server 20 has become ready for registration for specification information.

Although the present invention has been described in considerable detail with reference to certain preferred embodiments thereof, other embodiments are possible.

In the above mentioned embodiment, the management server 20 and the information providing server 30 are configured as separate devices, and the management of authentication information and the service offering are achieved under cooperation between the management server 20 and the information providing server 30.

However, the management server 20 and the information providing server 30 may be integrated into a single device. Alternatively or additionally, the information providing server 30 may be configured to have a part of the functions that the management server 20 has. Alternatively or additionally, the management server 20 may be configured to have a part of the functions that the information providing server 30 has.

In the above mentioned embodiment, explanation regarding the function of detecting an extended function unit is made using an example in which the MFD 10 judges that the specifications thereof are changed if the version up of firmware occurs or the attachment sensor detects attachment of an extended function unit to the MFD 10.

However, the MFD 10 may detect the change of specifications thereof in different manners. For example, the MFD 10 may be provided with a detection unit configured to detect transition to a state where the MFD 10 serves as an element of the service providing system.

In the above mentioned embodiment, the request for a service is transmitted from the MFD 10 to the information providing server 30 at a time when the job inquiry OS message is generated. However, the request for a service may be transmitted when a direct access to an access target of service offering (e.g., a particular URL or a port) is made in response to a particular user operation conducted by a user through the operation unit 12 of the MFD 10. For attaining such a configuration, the device process may be configured such that steps from S112 are executed when the particular user operation is conducted.

In the above mentioned embodiment, the information providing server 30 is configured to provide a service for a client by generating service information for a client which transmitted the request for execution of a service providing job, and providing the service information for the client.

However, a service may be provided for a client by providing service information which has been generated based on process target data supplied by the client and specification information of the client.

More specifically, the client may be provided with functions of: receiving transmission request of the process target data required for receiving a service from the information providing server which has received the service request from the client; transmitting the process target data to the information providing server when the transmission request is received; and transmitting the process target data to the information providing server when the transmission request is received.

In this case, the information providing server may be provided with functions of: transmitting the transmission request of the process target data to the client which transmitted the service request if the process target data is require for providing a service corresponding to the service request when the service request is received; receiving the process target data from the client; creating service information relating to a service based on the specification information registered in the management server in association with the client and the process target data when the process target data is received. In this case, the job execution process of FIG. 9 may be configured such that the process target data is requested before step S404 or after step S406, so as to receive the process target data transmitted from the client. In this case, the service information may be generated in step S408 based on the received process target data.

In this case, before step S214 of the process shown in FIG. 5, the client may operate to: request a user to designate data to be used for the process target data after receiving the request for the process target data; and to transmit the designated data to the information providing server 30 as the process target data. In this case, the information providing server 30 is able to generate the service information to be provided for the client.

In the above mentioned configuration, the client may be provided with a function of transmitting the process target data to the information providing server at timing when particular data is designated by the user as the process target data by requesting a user to designate process target data when the transmission request is received. Further, data to be used as process target data may be determined in advance. In this case, the process target data may be sent out at timing when the transmission request is received.

In the above mentioned embodiment, the MFD 10 is configured to prevent a service from undesirably being suspended by prohibiting transmission of the inquiry about presence or absence of a service. However, undesirable suspension of services may be prevented by preventing transition to step S112 (see FIG. 3), step S214 (see FIG. 5) or step S218 (see FIG. 5) from occurring until the device state changes to "Ready".

What is claimed is:
1. A service providing system having a multi-function client device, a management server and a service providing server,
  wherein the multi-function client device comprises:
    a sensor configured to detect whether a detachable extended function unit is attached to the client device;
    a communication unit comprising:
      a first client side transmitting unit configured to transmit specification information associated with a specification of the client device to the management server based on the result of detection by the sensor, the specification information comprises information indicating whether the detachable extended function unit is attached to the client device and parameters for performing functions;

a first client side receiving unit configured to receive registration completion information from the management server; and a second client side transmitting unit configured to transmit a request for service information to the service providing server; and a service prohibition unit configured to prevent the second client side transmitting unit from transmitting the request for service information to the service providing server until the registration completion information is received by the first client side receiving unit after transmission of the specification information by the first client side transmitting unit, wherein the management server comprises:
 a first management side receiving unit configured to receive the specification information from the client device;
 an information registration unit configured to register the specification information received by the first management side receiving unit while associating the specification information with the client device; and
 a first management side transmitting unit configured to transmit the registration completion information indicating completion of registration of the specification information by the information registration unit to the client device, and wherein the service providing server comprises:
 a first service side receiving unit configured to receive the request for service information from the client device; and
 an information generation unit configured to generate the service information based on the specification information registered in the management sever while being associated with the client device, wherein the information generation unit generates the service information in response to receipt of the request for service information from the client device by the first service side receiving unit.

2. The service providing system according to claim 1, wherein the client device further comprises:
 a second client side receiving unit configured to receive the service information transmitted from the service providing server; and
 a function execution unit configured to execute a function based on the service information received by the second client side receiving unit, wherein the service proving server comprises a first service side transmitting unit configured to transmit the service information generated by the information generation unit to the client device.

3. The service providing system according to claim 1, wherein the service prohibition unit of the client device controls the second client side transmitting unit to stop to transmit the request for service information, such that receipt of the service information from the service providing server is prevented.

4. The service providing system according to claim 1, wherein the client device further comprises:
 a third client side transmitting unit configured to transmit to the management server an inquiry associated with whether service information to be provided for the client device exists; and
 a third client side receiving unit configured to receive a response associated with the inquiry from the management server, wherein the second client side transmitting unit transmits the request for service information to the information providing server in response to receipt of the response indicating the presence of service information to be provided for the client device, wherein the service prohibition unit prevents at least one of transmission of the request for service information by the second client side transmitting unit and transmission of the inquiry by the third client side transmitting unit, such that receipt of the service information from the service providing server is prevented, wherein the management server further comprises:
 a second management side receiving unit configured to receive provision information associated with service information to be provided for a particular client device from the service providing server;
 an information management unit configured to register information associated with service information to be provided for the particular client device based on the provision information received by the second management side receiving unit;
 a third management side receiving unit configured to receive the inquiry from the client device;
 a service extraction unit configured to extract information representing service information to be provided for the client device from information registered by the information management unit in response to the inquiry from the client device; and
 a second management side transmitting unit configured to transmit the information extracted by the service extraction unit to the client device as the response to the inquiry, wherein the service providing server further comprises a second service side transmitting unit configured to transmit the provision information associated with service information to be provided for the particular client device to the management server.

5. The service providing system according to claim 1, wherein the client device further comprises:
 a fourth client side transmitting unit configured to transmit an advance notice indicating that the client device is ready for transmission of the specification information; and
 a fourth client side receiving unit configured to receive an acknowledgment of transmission transmitted from the management server which received the advance notice;

wherein the first client side transmitting unit transmits the specification information to the management server in response to receipt of the acknowledgment of transmission from the management sever, wherein the management server further comprises:
 a fourth management side receiving unit configured to receive the advance notice from the client device; and
 a third management side transmitting unit configured to transmit the acknowledgment of transmission to the client device after the advance notice is received by the fourth management side receiving unit, wherein the acknowledgement of transmission indicates that the management server accepts the specification information.

6. A multi-function client device configured to communicate with a management server and a service providing server, comprising:
 a sensor configured to detect whether a detachable extended function unit is attached to the client device;
 a communication unit comprising:
  a first client side transmitting unit configured to transmit specification information associated with a specification of the client device to the management server based on the result of detection by the sensor, the specification information comprises information indicating whether a detachable extended function unit is attached to the client device and parameters for performing functions;

a first client side receiving unit configured to receive registration completion information from the management server; and a second client side transmitting unit configured to transmit a request for service information to the service providing server; and a service prohibition unit configured to prevent the second client side transmitting unit from transmitting the request for service information to the service providing server until the registration completion information is received by the first client side receiving unit after transmission of the specification information by the first client side transmitting unit.

7. A server configured to communicate with a multi-function client device and a service providing server, comprising:

a first management side receiving unit configured to receive specification information associated with a specification of the client from the client, the specification information comprises information indicating whether a detachable extended function unit detected by a sensor of the client device is attached to the client device and parameters for performing functions at the client device;

an information registration unit configured to register the specification information received by the first management side receiving unit while associating the specification information with the client device; and a first management side transmitting unit configured to transmit registration completion information to the client device, wherein the registration completion information indicates completion of registration of the specification information by the information registration unit and the receipt of the registration completion information permits the transmission of a request for service information from the client device to the service providing server.

8. A server configured to communicate with a multi-function client device and a management server, comprising:

a first service side receiving unit configured to receive a request for service information from the client, wherein the request is transmitted from the client only after the client receives registration completion information from the management server indicating the completion of registration of specification information;

an information generation unit configured to generate service information based on specification information registered in the management sever while being associated with the client, wherein the information generation unit generates the service information in response to receipt of the request for service information from the client by the first service side receiving unit, the specification information comprises information indicating whether a detachable extended function unit detected by a sensor of the client device is attached to the client device and parameters for performing functions a the client device; and a first service side transmitting unit configured to transmit the service information generated by the information generation unit to the client device.

9. A non-transitory computer readable medium having computer readable instructions stored thereon, which, when executed by a computer, are configured to:

detecting whether a detachable extended function unit is attached to a multi-function client device;

transmit specification information associated with a specification of the client device to the management server based on the result of detecting, the specification information comprises information indicating whether the detachable extended function unit is attached to the client device and parameters for performing functions at the client device;

receive registration completion information from the management server;

transmit a request for service information to the service providing server;

receive service information transmitted from the service providing server;

execute a function based on the received service information received; and prevent the second client side transmitting unit from transmitting the request for service information to the service providing server until the registration completion information is received after transmission of the specification information to the management server.

10. A non-transitory computer readable medium having computer readable instructions stored thereon, which, when executed by a computer, are configured to:

receive specification information associated with a specification of a multi-function client device from the client device, the specification information comprises information indicating whether a detachable extended function unit detected by a sensor of the client device is attached to the client device and parameters for performing functions at the client device;

register the specification information while associating the specification information with the client device; and transmit registration completion information to the client device, wherein the registration completion information indicates completion of registration of the specification information and the receipt of the registration completion information permits the transmission of the request for service information from the client device to a service providing server.

11. A non-transitory computer readable medium having computer readable instructions stored thereon, which, when executed by a computer, are configured to:

receive a request for service information from a multi-function client device, wherein the client device transmits the request only after the client device receives registration completion information from a management server indicating the completion of registration of specification information;

generate service information based on specification information registered in the management sever while being associated with the client device, wherein the service information is generated in response to receipt of the request for service information from the client device, the specification information comprises information indicating whether a detachable extended function unit detected by a sensor of the client device is attached to the client device and parameters for performing functions at the client device; and transmit the service information to the client device.

12. The client device according to claim 6, further comprising:
- a second client side receiving unit configured to receive the service information transmitted from the service providing server; and
- a function execution unit configured to execute a function based on the service information received by the second client side receiving unit.

13. The client device according to claim 12, wherein the service prohibition unit of the client device controls the second client side transmitting unit to stop to transmit the request for service information, such that receipt of the service information from the service providing server is prevented.

14. The client device according to claim 13, further comprising:
- a third client side transmitting unit configured to transmit to the management server an inquiry associated with whether service information to be provided for the client device exists; and
- a third client side receiving unit configured to receive a response associated with the inquiry from the management server, wherein the second client side transmitting unit transmits the request for service information to the information providing server in response to receipt of the response indicating the presence of service information to be provided for the client device, and wherein the service prohibition unit prevents at least one of transmission of the request for service information by the second client side transmitting unit and transmission of the inquiry by the third client side transmitting unit, such that receipt of the service information from the service providing server is prevented.

15. The client device according to claim 14, further comprising:
- a fourth client side transmitting unit configured to transmit an advance notice indicating that the client device is ready for transmission of the specification information; and
- a fourth client side receiving unit configured to receive an acknowledgment of transmission transmitted from the management server which received the advance notice;
- wherein the first client side transmitting unit transmits the specification information to the management server in response to receipt of the acknowledgment of transmission from the management sever.

16. The server of claim 7, further comprising:
- a second management side receiving unit configured to receive provision information associated with service information to be provided for a particular client device;
- an information management unit configured to register information associated with service information to be provided for the particular client device based on the provision information received by the second management side receiving unit;
- a third management side receiving unit configured to receive the inquiry from the client device;
- a service extraction unit configured to extract information representing service information to be provided for the client device from information registered by the information management unit in response to the inquiry from the client device; and
- a second management side transmitting unit configured to transmit the information extracted by the service extraction unit to the client device as the response to the inquiry.

17. The server of claim 16, further comprising:
- a fourth management side receiving unit configured to receive the advance notice from the client device; and
- a third management side transmitting unit configured to transmit the acknowledgment of transmission to the client device after the advance notice is received by the fourth management side receiving unit, wherein the acknowledgement of transmission indicates that the management server accepts the specification information.

18. The server of claim 8, further comprising:
- a second service side transmitting unit configured to transmit provision information associated with service information to be provided for a particular client device to the management server.

19. The computer usable medium of claim 10, wherein when the computer readable instructions are executed by the computer, the computer readable instructions are further configured to:
- receive provision information associated with service information to be provided for a particular client device;
- register information associated with service information to be provided for the particular client device based on the provision information received by the second management side receiving unit;
- receive an inquiry from the client device; extract information representing service information to be provided for the client device from information registered by the information management unit in response to the inquiry from the client device; and
- transmit the information extracted by the service extraction unit to the client device as the response to the inquiry.

20. The computer readable medium of claim 19, wherein when the computer readable instructions are executed by the computer, the computer readable instructions are further configured to:
- receive the advance notice from the client device; and
- transmit the acknowledgement of transmission to the client device after the advance notice is received by the fourth management side receiving unit, wherein the acknowledgement of the transmission indicates that the management server accepts the specification information.

21. The computer usable medium of claim 11, wherein when the computer readable instructions are executed by the computer, the computer readable instructions are further configured to: transmit provision information associated with service information to be provided for a particular client device to the management server.

* * * * *